(12) United States Patent
Kaneda et al.

(10) Patent No.: US 6,451,868 B1
(45) Date of Patent: Sep. 17, 2002

(54) POLYURETHANE CHIP MOLDED PRODUCT AND METHOD FOR MANUFACTURING THE SAME

(75) Inventors: Hiroshi Kaneda; Takeo Yoshida, both of Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/699,337

(22) Filed: Oct. 31, 2000

(30) Foreign Application Priority Data

Nov. 4, 1999 (JP) .......................................... 11-314028

(51) Int. Cl.⁷ .............................................. C08G 18/08
(52) U.S. Cl. ........................ 521/137; 521/155; 521/170; 264/45.1; 264/45.3
(58) Field of Search ................................ 521/155, 137, 521/170; 264/45.1, 45.3

(56) References Cited

U.S. PATENT DOCUMENTS

| | | | |
|---|---|---|---|
| 3,726,624 A | 4/1973 | Schwarz | |
| 3,996,154 A | 12/1976 | Johnson et al. | |
| 5,055,339 A | 10/1991 | Eder et al. | |
| 5,880,165 A | * 3/1999 | Triolo et al. | 521/120 |
| 5,885,693 A | 3/1999 | Eder et al. | |

FOREIGN PATENT DOCUMENTS

| | | |
|---|---|---|
| DE | 43 34 453 | 4/1994 |
| JP | 9-183161 | 7/1997 |

* cited by examiner

*Primary Examiner*—John M. Cooney, Jr.

(57) ABSTRACT

A polyurethane chip molded product having improved properties and a method for manufacturing the same are provided. The polyurethane chip molded product is manufactured by press-molding polyurethane chips and a binder together, wherein at least some of the polyurethane chips are split polyurethane chips made by splitting foamed polyurethane.

10 Claims, No Drawings

US 6,451,868 B1

POLYURETHANE CHIP MOLDED PRODUCT AND METHOD FOR MANUFACTURING THE SAME

FIELD OF THE INVENTION AND RELATED ART STATEMENT

The present invention relates to a polyurethane chip molded product manufactured by crushing foamed polyurethane into chips and then molding the chips using a binder and a method for manufacturing the same.

Polyurethane foam products are widely used as bedding and a vehicle seat squab because of excellent cushioning and excellent heat retaining property.

There is a problem in disposing remaining materials produced when a product is manufactured by cutting a large polyurethane foam block and in disposing spent foam products. Under the circumstances, polyurethane chip products have been developed which are manufactured by crushing such remaining materials and spent foam products into chips and binding the chips using a suitable adhesive (Japanese patent publication H09-183161A).

The process of manufacturing the polyurethane chip products mainly includes steps of bonding the adhesive to the polyurethane chips, placing them in a mold, and applying pressure and heat to cause the binder to cure.

The polyurethane chips for manufacturing the polyurethane chip products may be chips made by cutting foamed polyurethane into small pieces and spherical chips made by comminuting foamed polyurethane. As a result of various studies, polyurethane chips including mainly spherical chips and partially non-spherical chips can exhibit improved properties (such as tensile strength, tear strength, and impact resistance) of a pressed polyurethane product.

OBJECT AND SUMMARY OF TE INVENTION

It is an object of the present invention to provide a polyurethane chip molded product having improved properties and a method for manufacturing the same.

A polyurethane chip molded product of the present invention is manufactured by press-molding polyurethane chips and a binder together. At least some of the polyurethane chips are chips made by splitting foamed polyurethane.

A method for manufacturing a polyurethane chip molded product of the present invention is a method by press-molding polyurethane chips and a binder together, wherein at least some of the polyurethane chips are split polyurethane chips made by splitting foamed polyurethane.

In the polyurethane chip molded product according to the present invention, the specific surface area of the split polyurethane chips is larger than that of spherical polyurethane chips, increasing touch areas between them and thus increasing the bonding strength of the polyurethane chips. As a result, the end product has improved properties such as tensile strength, tear strength, and impact resilience.

According to the present invention, all of the polyurethane chips may be split polyurethane chips.

According to the present invention, the polyurethane chips may be a mixture of spherical polyurethane chips and split polyurethane chips. The density of the split polyurethane chips may be equal to the density of the spherical polyurethane chips, but it is preferable that the density of the split polyurethane chips is smaller than the density of the spherical polyurethane chips.

It is preferable that the ratio of the split polyurethane chips to the entire polyurethane chips is 10 weight % or more. The split polyurethane chips are preferably made by splitting foamed polyurethane which is formed in a sheet-like configuration.

DETAILED DESCRIPTION OF THE PREFERRED EMBODIMENTS

Polyurethane chips used in the present invention are preferably made by splitting foamed polyurethane, formed in a sheet-like configuration having a thickness in a range from 20 mm to 200 mm, by a splitter. Each of the polyurethane chips split by the splitter has a plurality of projections radially projecting, i.e. a star-like shape.

Together with the aforementioned split polyurethane chips, spherical polyurethane chips may be employed. The spherical polyurethane chips are preferably made by crushing foamed polyurethane by a normal polyurethane foam crusher. Each of spherical polyurethane chips has a long diameter and a short diameter of which ratio is 2 or less, particularly 1.3 or less. The spherical polyurethane chips have such particle diameter as to pass through a screen having opening diameter in a range from 5 mm to 50 mm.

The spherical polyurethane chips are preferably mixed to the split polyurethane chips in such a manner that the ratio of the split polyurethane chips to the entire polyurethane chips is 10 weight % or more, more preferably 20 weight % or more. The split polyurethane chips are each interposed between the spherical polyurethane chips and strongly bonded to the spherical polyurethane chips, thereby improving the properties, such as strength, of the end product.

The density of the split polyurethane chips may be equal to and is preferably less than the density of the spherical polyurethane chips. When the density of the split polyurethane chips is set to be less than the density of the spherical polyurethane chips, spaces among the spherical polyurethane chips are filled with the split polyurethane chips because the split polyurethane chips are shrank largely than the spherical polyurethane chips during the press molding, thereby improving the properties of the end product such as strength. The density of the split polyurethane chips is preferably in a range from 15% to 100%, more preferably in a range from 30% to 50% of the spherical polyurethane chips.

To mold these polyurethane chips, the polyurethane chips and a binder may be separately supplied to a mold, but it is preferable that the binder is previously bonded to the polyurethane chips.

Suitably used as this binder is a polyurethane prepolymer type.

Other binders may be used, for example, solvent-based polyurethane or two-pack solventless polyurethane. These binders include, as the principal component, polymeric materials containing active isocyanate. As for the solvent-based polyurethane, the polymeric materials should be diluted with organic diluent because of their high viscosity. Halogenated solvent such as methylene chloride is generally employed as the organic diluent in order to satisfy conditions including volatility and non-combustibility. The tow-pack solventless polyurethane may be of a two-pack type in which amine hardener is used. Aqueous emulsion may be used as the binder.

Examples of aqueous resin emulsion include polyurethane emulsion group, polyacrylic ester emulsion group, polyvinyl acetate emulsion group, poly (ethylene/vinyl acetate) copolymer emulsion group, and poly (styrene/butadiene )copolymer emulsion group. These can be used singly, or in combination of two or more kinds. Alternatively, modified-resin emulsion prepared by modifying the resins may also be employed.

The binder is applied preferably in an amount of 3-20 weight %, more preferably 5-15 weight % of the polyurethane chips, as in form of solid state.

The binder may be applied by spraying. The binder may be sprayed while agitating the polyurethane chips. After filling the polyurethane chips bonded with the binder (or filling the polyurethane chips and the binder) into a mold, pressure and heat are applied to cause the binder to be hardened. The pressure should be selected to achieve the density of end products. The pressure may be applied from one direction i.e. by uniaxial press or from plural directions i.e. by multiaxial press.

To apply heat as mentioned, supplying of hot steam into the mold is preferable. When the binder is aqueous emulsion, hot air may be supplied into the mold.

When a hardened product removed from the mold is wet due to the steam, it is preferable to dry the product. The product may be dried by a dryer or may be dried in air.

Polyurethane chip molded products according to the present invention may be used as various products such as seat squabs, head rests, and arm rests for passenger cars, trucks, and motorcycles; flooring materials for passenger cars and trucks; insulators including soundproof materials for passenger cars and trucks; cushioning materials for sofas and beds; and materials to be laid under carpet.

Hereinafter, description will now be made with reference to a comparative example and examples.

Comparative Example 1

A HR (high resilience) foam of 0.050 g/cm$^3$ density was crushed by a BO-series crusher manufactured by Horai Company, in which a screen of φ8 mm has been set, to obtain spherical polyurethane chips of which average particle diameter is φ8 mm. The ratio of the long diameter to the short diameter of each chip was 1.2 in average.

12 phr (parts per hundred parts of resin) of a polyurethane polymer type binder was sprayed to 100 phr of the polyurethane chips to obtain polyurethane chips of 1700 g.

The polyurethane chips were filled in a mold: 400 mm×400 mm×110 mm. Hot steam of 80° C. was injected from the bottom of the mold for three minutes while applying pressure, so as to harden the binder. In this manner, a polyurethane chip molded product was manufactured.

EXAMPLE 1

A HR foam of 0.050 g/cm$^3$ density was crushed by the BO-series crushing machine manufactured by Horai Company, in which a screen of φ8 mm has been set, to obtain spherical polyurethane chips of which average particle diameter is φ8 mm, just like Comparative Example 1.

A HR foam of 0.050 g/cm$^3$ density was split by a splitter to obtain star-shaped polyurethane chips of which average particle diameter is 5 mm.

75 phr of the spherical polyurethane chips and 25 phr of the star-shaped polyurethane chips thus obtained were mixed. After that, 12 phr of a polyurethane polymer type binder was sprayed to 100 phr of the mixed polyurethane chips to obtain polyurethane chips of 1700 g.

The polyurethane chips were filled in a mold: 400 mm×400 mm×110 mm. Hot steam of 80° C. was injected from the bottom of the mold for three minutes while applying pressure, so as to harden the binder. In this manner, a polyurethane chip bonded, pressed, and molded product was manufactured.

EXAMPLE 2

A HR foam of 0.050 g/cm$^3$ density was split by a splitter to obtain star-shaped polyurethane chips of which average particle diameter is 5 mm, just like Example 1.

12 phr of a polyurethane polymer type binder was sprayed to 100 phr of the star-shaped polyurethane chips to obtain polyurethane chips of 1700 g.

The polyurethane chips were filled in a mold: 400 mm×400 mm×110 mm. Hot steam of 80° C. was injected from the bottom of the mold for three minutes while applying pressure, so as to harden the binder. In this manner, a polyurethane chip bonded, pressed, and molded product was manufactured.

EXAMPLE 3

A HR foam of 0.050 g/cm$^3$ density was crushed by the BO-series crushing machine manufactured by Horai Company, in which a screen of φ8 mm has been set, to obtain spherical polyurethane chips of which average particle diameter is φ8 mm, just like Comparative Example 1 and Example 1.

A slab foam of 0.020 g/cm$^3$ density was split by a splitter to obtain star-shaped polyurethane chips of which average particle diameter is 5 mm.

75 phr of the spherical polyurethane chips and 25 phr of the star-shaped polyurethane chips thus obtained were mixed. After that, 12 phr of a polyurethane polymer type binder was sprayed to 100 phr of the mixed polyurethane chips to obtain polyurethane chips of 1700 g.

The polyurethane chips were filled in a mold: 400 mm×400 mm×110 mm. Hot steam of 80° C. was injected from the bottom of the mold for three minutes while applying pressure, so as to harden the binder. In this manner, a polyurethane chip bonded, pressed, and molded product was manufactured.

The polyurethane chip bonded, pressed, and molded products obtained as mentioned above were tested for their properties according to the method specified in JASO (Japanese Automobile Standards Organization) B408. The results are shown in Table 1.

TABLE 1

| No. | Comparative Example 1 | Example 1 | Example 2 | Example 3 |
|---|---|---|---|---|
| chips | | | | |
| ratio of spherical chips (wt %) | 100 | 75 | 0 | 75 |
| density of spherical chips (g/cm$^3$) | 0.050 | 0.050 | 0.050 | 0.050 |
| ratio of star-shaped chips (wt %) | 0 | 25 | 100 | 25 |
| density of star-shaped chips (g/cm$^3$) | 0.050 | 0.050 | 0.050 | 0.020 |
| molded product | | | | |
| density (g/cm$^3$) | 0.087 | 0.085 | 0.087 | 0.087 |
| hardness (kgf) | 17.7 | 19.4 | 22.9 | 22.8 |
| tensile strength (Pa) | $0.53 \times 10^{-6}$ | $0.54 \times 10^{-6}$ | $0.76 \times 10^{-6}$ | $0.74 \times 10^{-6}$ |
| elongation (%) | 57 | 52 | 55 | 54 |

TABLE 1-continued

| No. | Comparative Example 1 | Example 1 | Example 2 | Example 3 |
|---|---|---|---|---|
| tear strength (N/cm) | 3.4 | 3.9 | 7.1 | 5.4 |
| impact resilience (%) | 55 | 57 | 61 | 60 |

As apparent from the examples and the comparative example mentioned above, the present invention can provide polyurethane chip products having improved properties such as tensile strength, tear strength, and impact resistance.

What is claimed is:

1. A polyurethane chip molded product manufactured by press-molding comprising: polyurethane chips, at least some of said polyurethane chips being split polyurethane chips of foamed polyurethane, each having a plurality of projections projecting radially outwardly, and a binder for binding the polyurethane chips.

2. A polyurethane chip molded product as claimed in claim 1, wherein said polyurethane chips are a mixture of spherical polyurethane chips and the split polyurethane chips.

3. A polyurethane chip molded product as claimed in claim 2, wherein the density of the split polyurethane chips is smaller than the density of the spherical polyurethane chips.

4. A polyurethane chip molded product as claimed in claim 2, wherein the density of the split polyurethane chips is equal to the density of the spherical polyurethane chips.

5. A polyurethane chip molded product as claimed in claim 2, wherein a ratio of the split polyurethane chips to the entire polyurethane chips is 10 weight % or more.

6. A polyurethane chip molded product as claimed in claim 1, wherein all of the polyurethane chips are split polyurethane chips.

7. A method for manufacturing a polyurethane chip molded product comprising, splitting foamed polyurethane to form split polyurethane chips, each having a plurality of projections projecting radially outwardly, and press-molding polyurethane chips containing at least said split polyurethane chips and a binder together so as to manufacture the polyurethane chip molded product as claimed in claim 1.

8. A method for manufacturing a polyurethane chip molded product as claimed in claim 7, wherein said split polyurethane chips are made by splitting foamed polyurethane which is formed in a sheet configuration.

9. A polyurethane chip molded product as claimed in claim 1, wherein said split polyurethane chip has a specific surface area greater than that of a spherical polyurethane chip.

10. A polyurethane chip molded product as claimed in claim 9, wherein said split polyurethane chip has an average particle diameter of 5 mm in a star shape.

* * * * *